US012667973B2

(12) United States Patent
Aldana Lopez et al.

(10) Patent No.: US 12,667,973 B2
(45) Date of Patent: Jun. 30, 2026

(54) VISUAL SERVOING WITH REAL-TIME DIFFUSION-BASED IMAGE INPAINTING

(71) Applicant: Intel Corporation, Santa Clara, CA (US)

(72) Inventors: Rodrigo Aldana Lopez, Zapopan (MX); David Gomez Gutierrez, Tlaquepaque (MX); Leobardo Campos Macias, Guadalajara (MX); Javier Felip Leon, Hillsboro, OR (US); David Gonzalez Aguirre, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 18/941,325

(22) Filed: Nov. 8, 2024

(65) Prior Publication Data

US 2026/0131474 A1 May 14, 2026

(51) Int. Cl.
B25J 13/08 (2006.01)
B25J 9/16 (2006.01)
(Continued)

(52) U.S. Cl.
CPC ............. B25J 9/1697 (2013.01); B25J 13/08 (2013.01); G06T 5/50 (2013.01); G06T 5/60 (2024.01);
(Continued)

(58) Field of Classification Search
None
See application file for complete search history.

(56) References Cited

U.S. PATENT DOCUMENTS

2004/0162647 A1* 8/2004 Koshizen ............. G05D 1/0088
701/2
2021/0138656 A1* 5/2021 Gothoskar ............. G06V 20/10
(Continued)

OTHER PUBLICATIONS

Zhang, Tianlin, et al. "Dynamic object tracking for quadruped manipulator with spherical image-based approach." 2023 IEEE/RSJ International Conference on Intelligent Robots and Systems (IROS). IEEE, 2023. (Year: 2023).*
(Continued)

*Primary Examiner* — Khoi H Tran
*Assistant Examiner* — Dairon Estevez
(74) *Attorney, Agent, or Firm* — Banner & Witcoff, Ltd.

(57) ABSTRACT

Various aspects of visual servoing based on use of a generative diffusion model are described. One technique includes obtaining a current view image from a robot camera that captures a portion of an environment of the robot, and obtaining a spherical image from a previous view that depicts a surrounding area of the environment of the robot. The current view image is combined with the previous spherical image to produce a modified spherical image, and inpainting is performed in a mask area of the modified spherical image with a generative diffusion model. The inpainting blends the current view image with the previous spherical image, providing a view of the entire environment of the robot that can be used for visual servoing. The robot can perform path planning and visual servoing of an end effector based on the modified spherical image, independent of any use of an external positioning or localization system.

20 Claims, 12 Drawing Sheets
(3 of 12 Drawing Sheet(s) Filed in Color)

┌─ 900

902 ─
CAPTURE CURRENT VIEW IMAGE FROM ROBOT CAMERA

904 ─
COMBINE THE CURRENT VIEW IMAGE WITH A PREVIOUS VIEW SPHERICAL IMAGE TO PRODUCE A MODIFIED SPHERICAL IMAGE

906 ─
PERFORM INPAINTING OF MASK AREA
(E.G., AROUND THE CURRENT VIEW IMAGE)
USING A GENERATIVE DIFFUSION MODEL

908 ─
DETECT AND CORRECT OCCLUSION IN
THE CURRENT VIEW IMAGE, USING THE PREVIOUS VIEW
SPHERICAL IMAGE AND GENERATIVE DIFFUSION MODEL

910 ─
PERFORM VISUAL SERVOING TO MOVE THE ROBOT,
BASED ON THE MODIFIED SPHERICAL IMAGE

(51) Int. Cl.

| | |
|---|---|
| *G06T 5/50* | (2006.01) |
| *G06T 5/60* | (2024.01) |
| *G06T 5/77* | (2024.01) |
| *G06V 10/26* | (2022.01) |
| *G06V 10/74* | (2022.01) |
| *G06V 10/98* | (2022.01) |

(52) U.S. Cl.

CPC .............. *G06T 5/77* (2024.01); *G06V 10/26* (2022.01); *G06V 10/74* (2022.01); *G06V 10/98* (2022.01); *G06T 2207/20221* (2013.01); *G06V 2201/06* (2022.01)

(56) References Cited

U.S. PATENT DOCUMENTS

| | | | |
|---|---|---|---|
| 2023/0234233 A1* | 7/2023 | Goyal | G06T 7/269 |
| 2024/0118103 A1* | 4/2024 | Shin | G01C 21/206 |
| 2024/0192690 A1* | 6/2024 | Ebrahimi Afrouzi .. | G06N 3/047 |
| 2025/0166131 A1* | 5/2025 | Yun | G06T 3/40 |
| 2025/0292498 A1* | 9/2025 | Badki | G06T 17/00 |
| 2025/0378619 A1* | 12/2025 | Wang | G06T 15/04 |
| 2026/0001224 A1* | 1/2026 | Garagic | B25J 9/1661 |

OTHER PUBLICATIONS

Pathre, Pranjali, et al. "Imagine2Servo: Intelligent Visual Servoing with Diffusion-Driven Goal Generation for Robotic Tasks." 2024 IEEE/RSJ International Conference on Intelligent Robots and Systems (IROS). IEEE, 2024. (Year: 2024).*

R. Kelly, R. Carelli, O. Nasisi, B. Kuchen and F. Reyes, "Stable visual servoing of camera-in-hand robotic systems," in IEEE/ASME Transactions on Mechatronics, vol. 5, No. 1, pp. 39-48, Mar. 2000 (Year: 2000).*

ChachuÅa, Krystian, and Maciej StefaÅczyk. "The utilization of spherical camera in simulation for service robotics." arXiv preprint arXiv:2103.09297 (2021). (Year: 2021).*

Becerra, H. M., "Wheeled Mobile Robots Navigation From a Visual Memory Using Wide Field of View Cameras", The 2010 IEEE RSJ International Conference on Intelligent Robots and Systems, (Oct. 2010), 7 pgs.

Kumar, Akshay, "An Overview of Visual Servoing for Robot Manipulators", [Online]. Retrieved from the Internet: https: control.com technical-articles an-overview-of-visual-servoing-for-robot-manipulators, (May 15, 2020), 9 pgs.

Rashed, Hazem, "FisheyeYOLO Object Detection on Fisheye Cameras for Autonomous Driving", Machine Learning for Autonomous Driving Workshop at the 34th Conference on Neural Information Processing Systems, (2020), 5 pgs.

* cited by examiner

PREVIOUS SCENARIO INFORMS DIFFUSION MODEL FOR MASKED REGION

DIFFUSION PROCESS

520

506

INPUT IMAGES

504

502

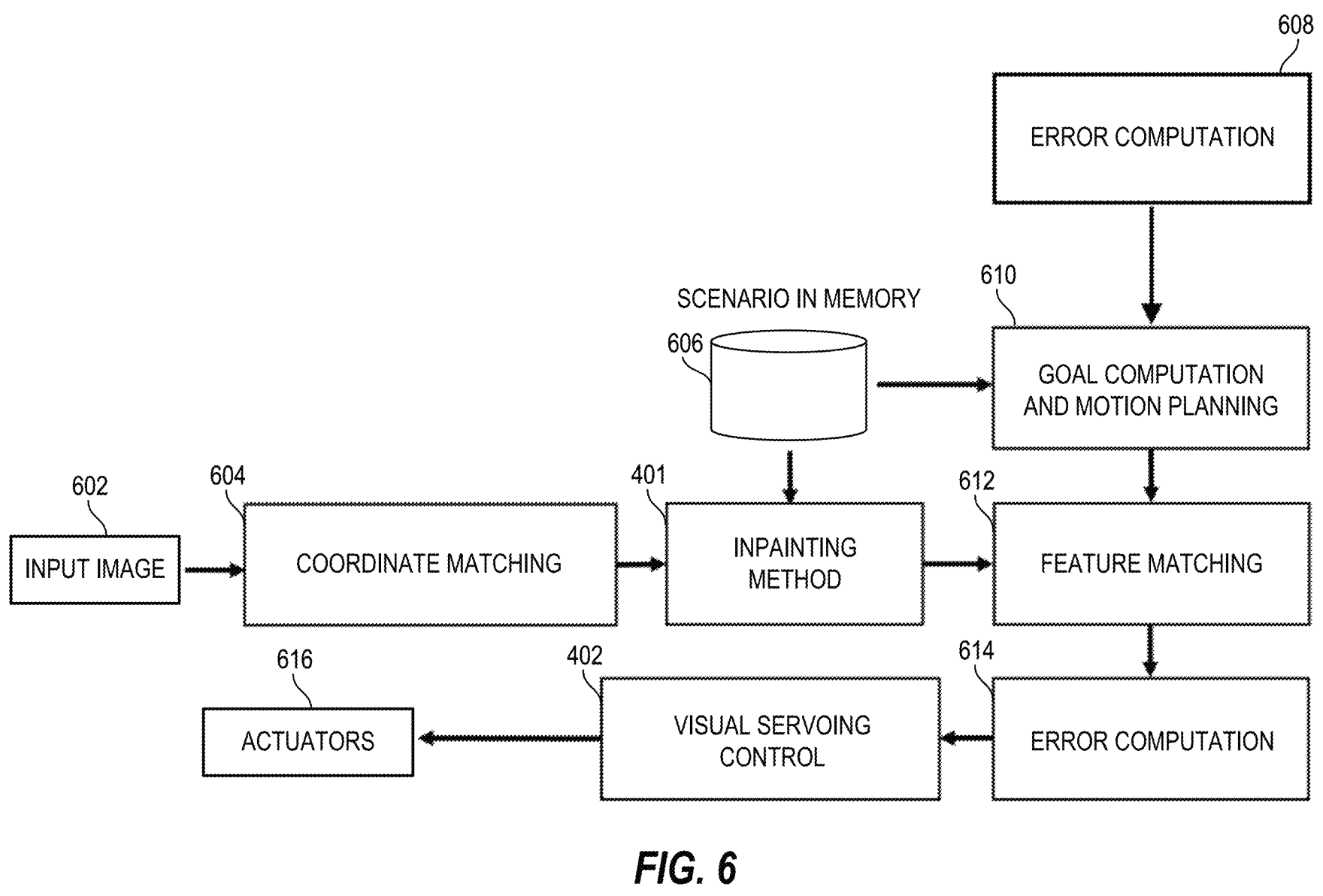

608 ERROR COMPUTATION

610 GOAL COMPUTATION AND MOTION PLANNING

612 FEATURE MATCHING

614 ERROR COMPUTATION

606 SCENARIO IN MEMORY

401 INPAINTING METHOD

402 VISUAL SERVOING CONTROL

604 COORDINATE MATCHING

602 INPUT IMAGE

616 ACTUATORS

*FIG. 6*

CURRENT VIEW
(E.G. WITH DIFFUSION
IN-PAINTING)

GOAL VIEW

900

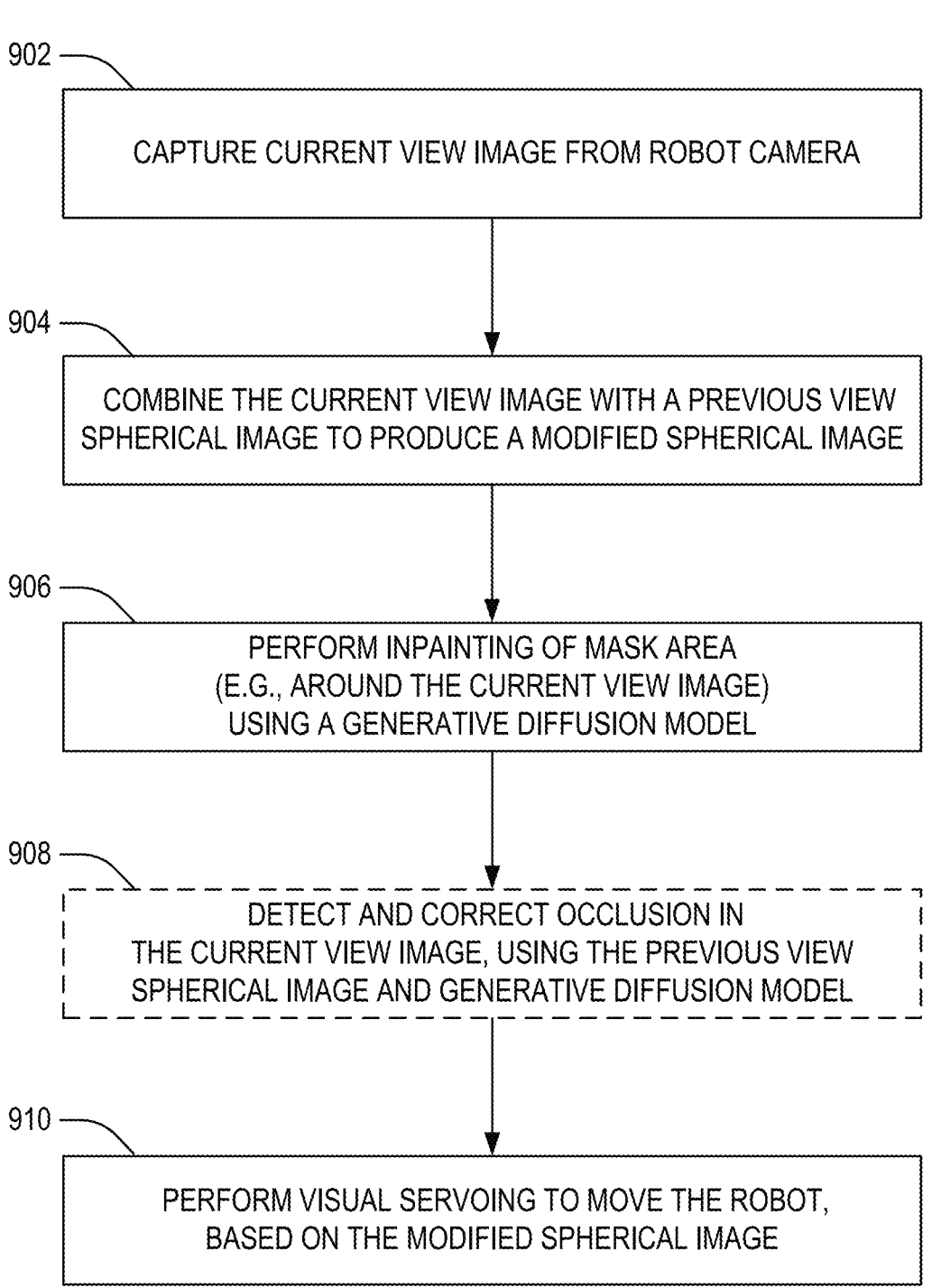

902

CAPTURE CURRENT VIEW IMAGE FROM ROBOT CAMERA

904

COMBINE THE CURRENT VIEW IMAGE WITH A PREVIOUS VIEW
SPHERICAL IMAGE TO PRODUCE A MODIFIED SPHERICAL IMAGE

906

PERFORM INPAINTING OF MASK AREA
(E.G., AROUND THE CURRENT VIEW IMAGE)
USING A GENERATIVE DIFFUSION MODEL

908

DETECT AND CORRECT OCCLUSION IN
THE CURRENT VIEW IMAGE, USING THE PREVIOUS VIEW
SPHERICAL IMAGE AND GENERATIVE DIFFUSION MODEL

910

PERFORM VISUAL SERVOING TO MOVE THE ROBOT,
BASED ON THE MODIFIED SPHERICAL IMAGE

*FIG. 9*

VISUAL SERVOING WITH REAL-TIME DIFFUSION-BASED IMAGE INPAINTING

BACKGROUND

Robots and other autonomous agents may be programmed to complete complex real-world tasks. Robotics use artificial intelligence (AI) to perform tasks in industrial environments. Robotics span a wide range of industrial applications, such as smart manufacturing assembly lines, multi-robot automotive component assembly, computer and consumer electronics fabrication, smart retail and warehouse logistics, robotic data centers, etc.

In robotics, particularly in applications involving robotic arms, visual servoing is a crucial technique for precise manipulation and control. Visual servoing relies on the feedback from a camera mounted on the robot to guide its movements towards a desired goal position, typically defined by a target image, such as a QR code marking the place from which an object must be grabbed. This problem is important in several industrial tasks where precision is required, and real-time images can be used to obtain feedback from the current scene. However, a significant technical challenge arises when there is insufficient overlap between the current view from the camera and the goal image. This lack of overlap hampers the ability to compute accurate control feedback, which is essential for guiding the robotic arm effectively.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 depicts a block diagram of a process for visual servoing based on results of a diffusion-based image inpainting procedure, according to an example.

FIG. 9 illustrates a flowchart showing a technique for diffusion-based inpainting of an image used for visual servoing, according to an example.

DETAILED DESCRIPTION

The following discusses improvements of robotic movement from visual servoing, based on real-time diffusion-based image processing techniques. The following approaches include a system for maintaining a virtual 360-degree spherical image around a robot, onto which current images (e.g., real-time two-dimensional images captured by a standard camera) are inpainted into earlier spherical (e.g., 360-degree) scene images using modern diffusion models. This ensures continuous visual overlap between a virtual or simulated 360-degree panoramic image and a target 360-degree panoramic image, allowing for uninterrupted image-based control without the need for switching strategies. This system also adapts to dynamic environments by updating the virtual panoramic image as a manipulator of the robot changes position, allowing visual servoing to be used in a variety of scenarios.

By integrating modern diffusion models into 360-degree spherical imaging, this system enhances the precision and adaptability of robotic systems in dynamic environments. These approaches enable smoother and faster motions of the robot by relying on visual servoing while maintaining accurate task execution. Further, these approaches enable a robot to perform path planning directly in the spherical image space, which is typically not possible with conventional methods.

Other aspects disclosed herein include optimization of the diffusion model and the results of images produced from the diffusion model. As one example, a diffusion model may be fine-tuned to minimize artifacts in inpainted images without affecting the task performance of the visual servoing control. In another example, occlusions in visual servoing can be overcome by using previously captured image data to inpaint occluded areas within the 360-degree spherical image using a diffusion-based technique. These and other variations to image processing used for visual servoing are discussed in the following paragraphs.

Figure 1:
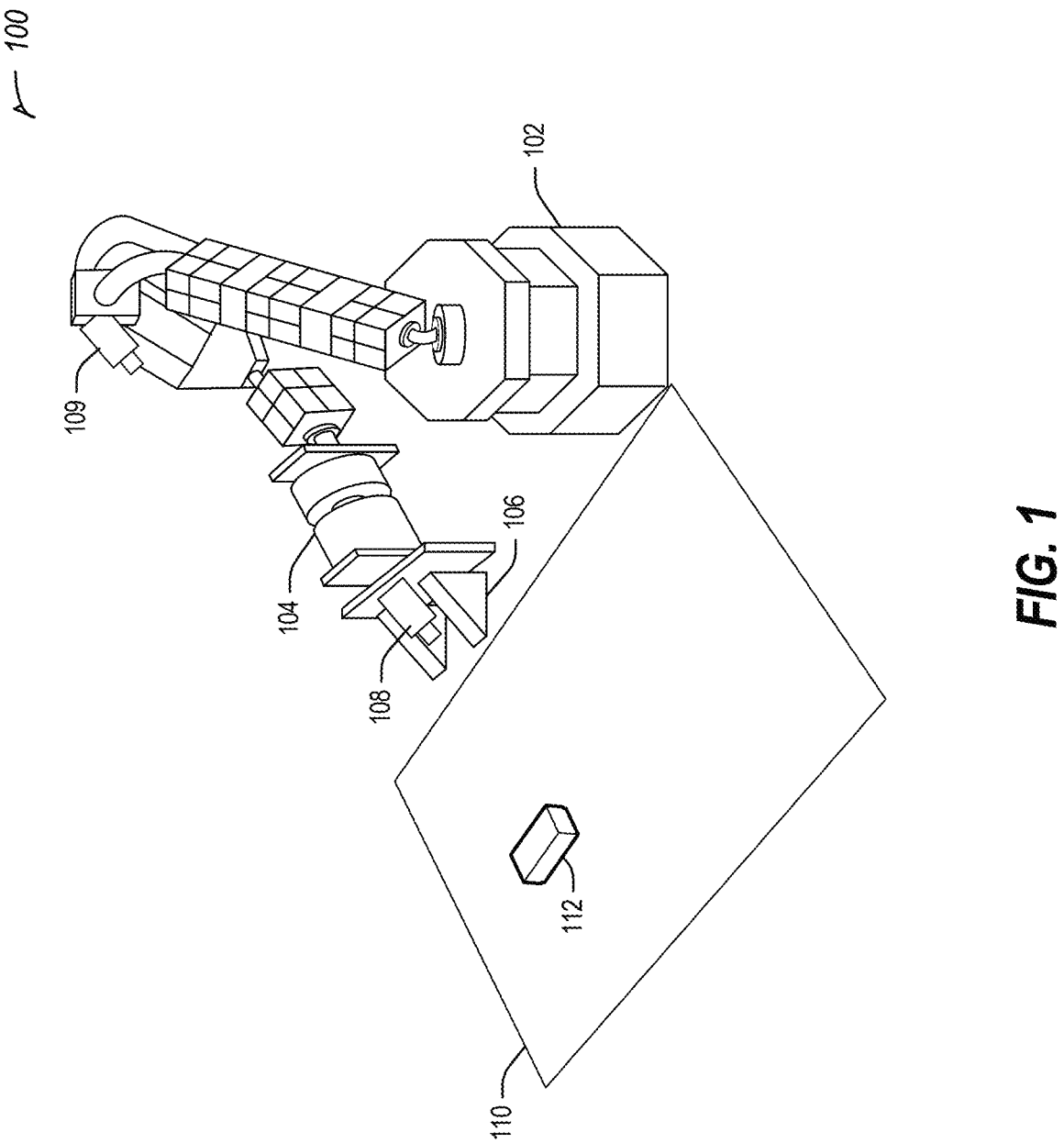
FIG. 1 illustrates a robotic system including a camera and a robotic arm according to an example.

FIG. 1 illustrates a configuration of a robot in an example robotic system 100. The robotic system 100 includes a robot 102 (e.g., including a locomotor), a robotic arm 104 (e.g., including a manipulator), an end effector 106, and at least one camera such as camera 108 affixed to a portion of the end effector 106 or the robotic arm 104. Other cameras such as a camera 109 may be affixed to a joint, linkage, segment, or other portion of the robotic arm 104 other than the end effector 106. The end effector 106 may be actuated to interact with a surface 110 or objects on the surface 110, which may include an object 112 of interest.

The one or more of the cameras 108 or 109 may be used to guide the end effector 106 to interact with the object 112 via visual servoing techniques. The camera 108 on the end effector 106 or the robotic arm 104 may be used as a primary camera to capture a real-time, current view image. This current view image, when added into a spherical image of a larger environment as discussed herein, can provide visual information to guide a controller of the robotic arm 104 to place the end effector 106 in a particular position, along a particular trajectory or path, etc. The camera 109 may be used as a backup camera, such as when a field of view of the camera 108 is occluded, or when the camera 108 loses sight of a particular object such as the object 112 or a portion of the surface 110.

The robotic system 100 is adapted to use visual servoing as a closed-loop control technique. The one or more cameras of the robotic arm 104 may be used for planning movement of the end effector 106. Controlling the end effector 106 may include moving more than one joint of the robotic arm 104. For example, when the end effector 106 is extended towards the object 112, the joint with the camera 108 may move. The robotic arm 104 includes at least one manipulator redundancy (e.g., elbow, shoulder, wrist joints, etc.). The one or more cameras (e.g., 108 and 109) may be used to track the object 112 via the present techniques for visual servoing, even if the object 112 is outside of the direct field of view of the one or more cameras.

In an example, movement of the robotic arm 104 may be planned. The plan may include a path, such as including a first position as a starting position and a second position as an ending position. From there, joint angles may be computed using kinematics to determine a trajectory along the path. The path may include one or more positions between the first and second positions. The path may include an orientation. In some examples, a random sampling of a path may be used to determine whether there is a collision. The trajectory may be determined to comply with the path, moving the end effector 106 to avoid collisions, and maintaining line of sight or at least partial line of sight to the object 112 from at least one of the cameras 108 or 109 during movement. In some examples, a velocity may be applied to a portion of the robotic arm 104 that does not change the velocity of the end effector 106. Said another way, there may be multiple trajectories in the joints that result in a same trajectory in the end effector 106. The multiple trajectories may be used to obtain a trajectory to maintain a line of sight to the object 112. Either of camera 108 or 109 may be attached to the robotic arm 104 after market, be integrated into the robotic arm 104 at time of manufacture, etc.

Figure 2:
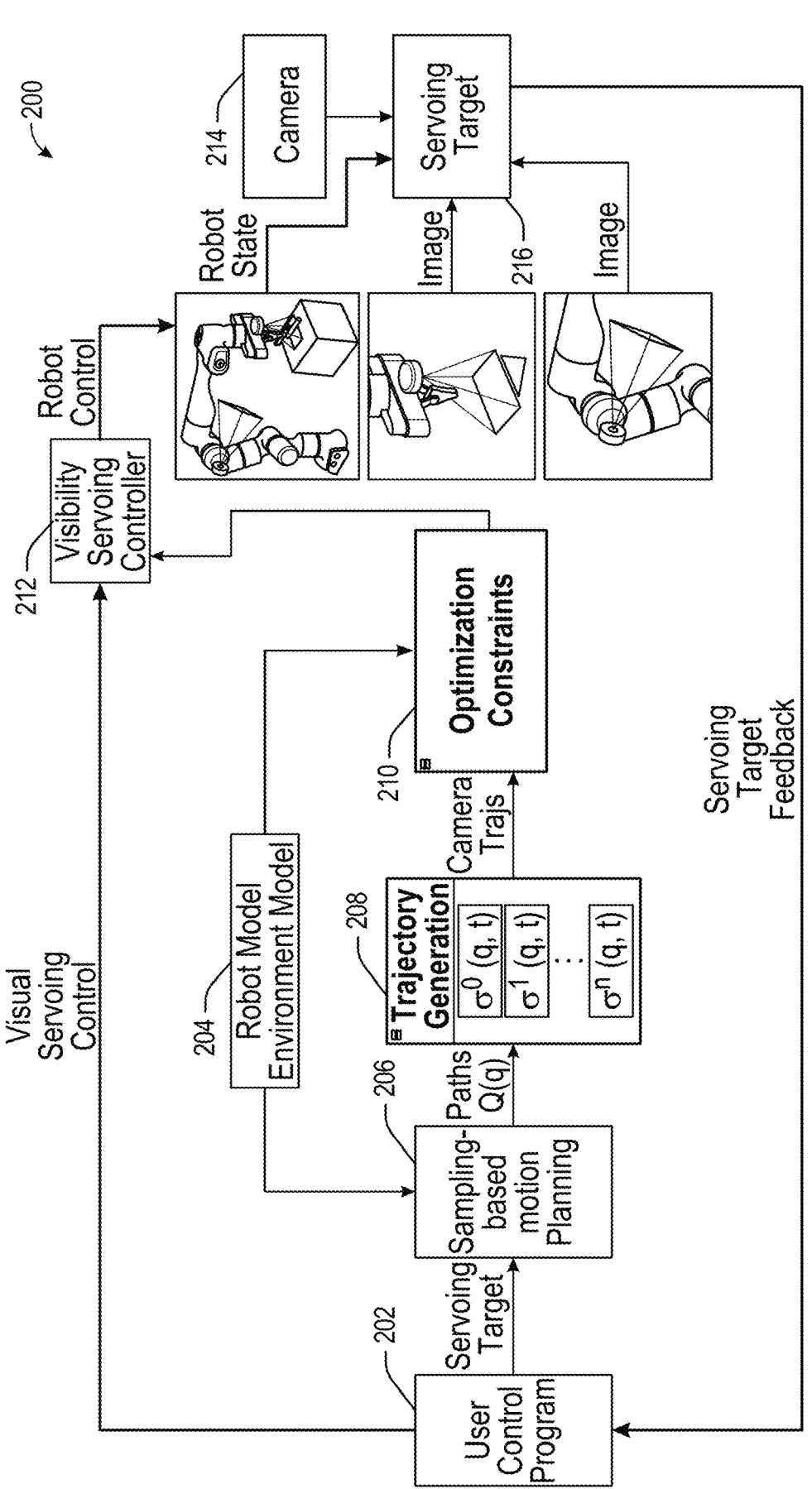
FIG. 2 illustrates a block diagram of a visual servoing system used with a robotic system according to an example.

FIG. 2 illustrates a block diagram 200 of an example visual servoing system used with a robot such as provided by the robotic system 100. The block diagram 200 includes example types of visual servoing components, but it will be understood that other (e.g., additional or substitute) components may integrated. For example, a user control program 202 may be used to provide a servoing target, which when used with a robot model or environment model 204, may be fed to a sampling-based motion planning function 206 to generate paths. A trajectory generation function 208 may use the paths to generate trajectories, which may be optimized by an optimization constraints function 210. An output control may be sent to a visibility servoing controller 212, which may use information from the user control program 202 to output controls to a robot, for example including a camera 214, to move an end effector toward a servoing target 216.

Figure 3:
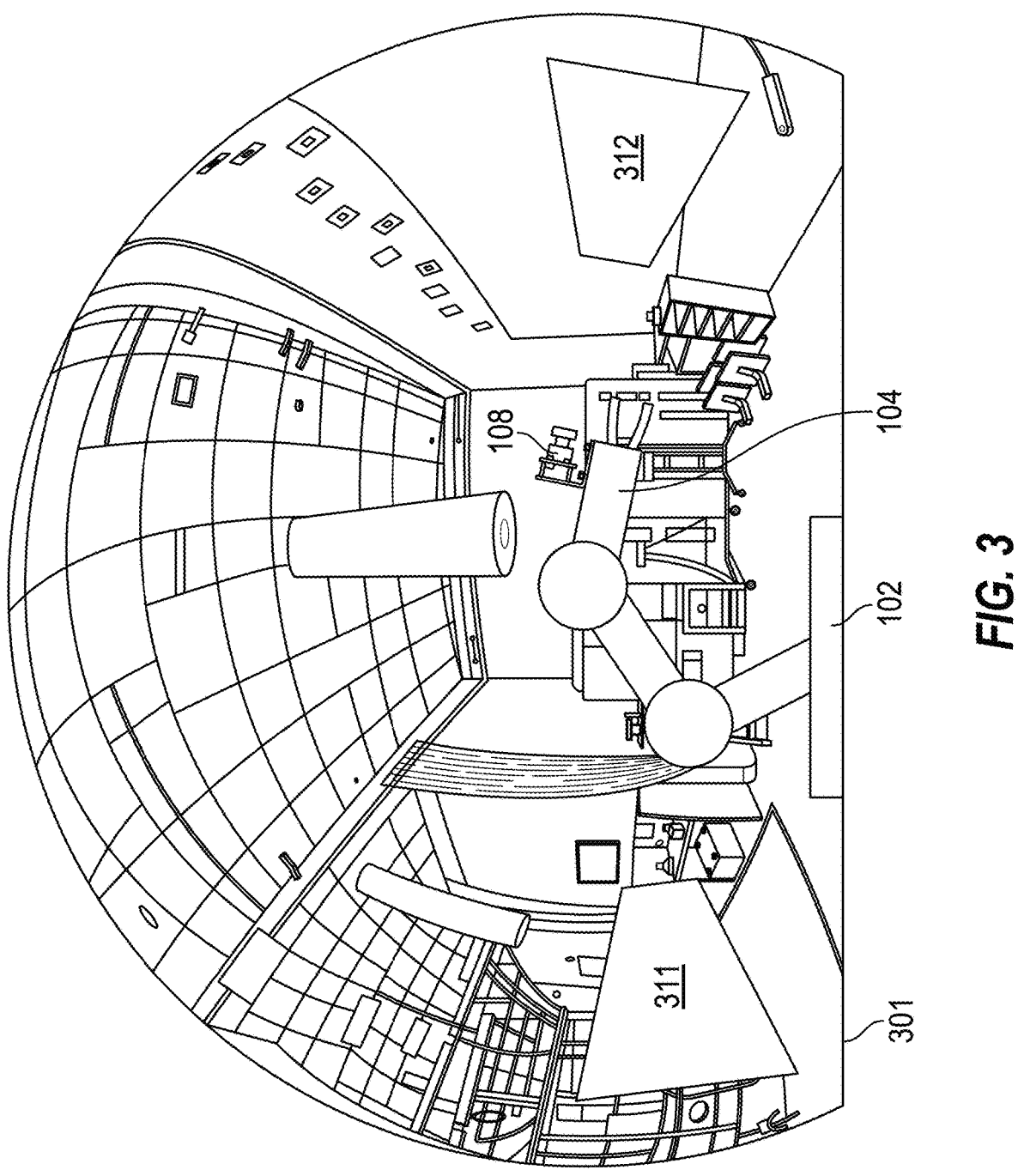
FIG. 3 depicts a scenario of visual servoing for a robotic system including a robotic arm, according to an example.

FIG. 3 depicts an example scenario of visual servoing for the robotic system 100. Here, the robot 102 operates a robotic arm 104 in an environment. Similar to the configurations previously described, the robotic arm 104 includes a camera 108 mounted on, at, or near the end effector. Other features of the robot 102 are not depicted for simplicity.

A spherical view 301 is depicted in FIG. 3 to portray the environment that the robot 102 operates in. This spherical view 301 specifically shows a two-dimensional perspective of a three-dimensional environment (the real-world space) surrounding the robot 102. The goal is for the robotic arm 104 to achieve a target configuration (e.g., where a target object is located), guided by a goal view 311. However, based on the position of the robotic arm 104, the camera 108 is actually directed towards a current view 312 that is far from the goal view. This scenario will lead to insufficient image overlap of images of the views 311 and 312.

Visual servoing systems traditionally depend on a two-phase approach to overcome the challenge of insufficient image overlap. For example, position-based control (e.g., from a positioning system) may be used to maneuver the robotic arm until there is enough overlap between a current view image and a goal image. Once this overlap is achieved, the robotic system transitions back to image-based control, where visual feedback fine-tunes the alignment and performs visual servoing operations. This conventional approach to visual servoing relies heavily on the precision of position sensors or resource-intensive visual localization techniques and can lead to potential inaccuracies due to external calibration needs. Likewise, achieving the necessary overlap between the current view and goal view images (e.g., images of current view 312 and goal view 311) often requires multiple adjustments, causing inefficiencies and latency when the robotic arm switches between position-based and image-based control to prevent interference.

A different workaround for insufficient image overlap involves the use of external cameras or sensors, such as 360-degree cameras mounted on the robot or elsewhere in the environment to monitor the robot's entire surroundings. However, the use of external cameras adds additional complexity to the infrastructure and to robot visual servoing operations, providing increased complexity in the control logic that increases the risk of errors and failures. These challenges are exacerbated in dynamic or complex environments where the spatial relationship between the robotic arm and the target can change rapidly, limiting the system's responsiveness and accuracy.

The approaches herein introduce the use of a modified spherical image that represents the environment and the use of an inpainting technique to combine a current view with a prior view, for use with a visual servoing method. These approaches offer improvements to different stages of the visual pipeline and offer improved techniques to enable a consistent use of visual servoing in a variety of robotic use cases. Importantly, the use of visual servoing control with the present approaches does not require switching between visual and positioning systems or controllers. Thus, even if the robot is positioned far from its goal, it can still achieve fast motion towards a region near the goal, followed by a gradual slow down without abrupt stopping, until the robot reaches its goal. In contrast, with conventional solutions, the robot will stop completely or slow down significantly when switching between two controllers or approaches.

Figure 4:
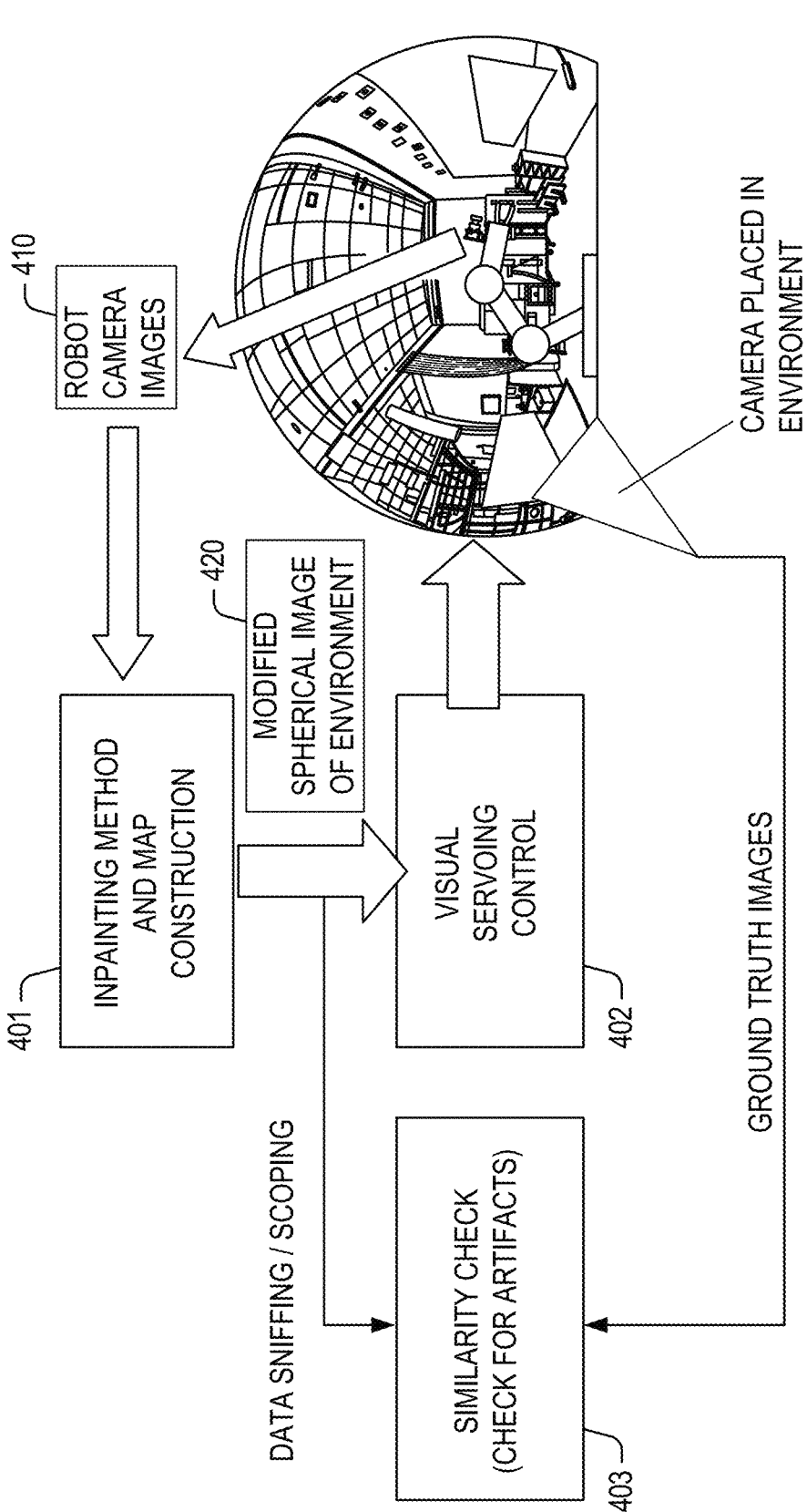
FIG. 4 depicts a block diagram of operations for visual servoing integrating real-time diffusion-based image inpainting, according to an example.

FIG. 4 depicts a block diagram of example operations for visual servoing of a robot that integrate diffusion-based image inpainting from partial real-time views of the robot environment. These operations include an inpainting method and map construction operation 401, performed on one or more robot camera images 410, to produce a modified spherical image 420 (e.g., a virtual or simulated image) that drives the visual servoing control 402 in real-time. To enable the robot to traverse its configuration space from its current view (e.g., view 312) to a goal view (e.g., view 311), the robot performs the visual servoing control 402 based on a modified spherical image 420 that blends real-world information with known past information. Specifically, the modified spherical image 420 is produced from real-time, diffusion-based inpainting of mask areas of the image, as visual information captured in the robot camera images 410 is combined with visual information of the larger environment (such as produced by ground truth images or prior camera images).

The example operations of FIG. 4 also depict the use of a similarity check operation 403, which is used to check for artifacts or issues in the modified spherical image of the environment. For example, the diffusion model may in some situations add problematic artifacts or objects to the modified spherical image that would disrupt the use of visual servoing based on the modified spherical image. The similarity check operation 403 can compare information in the modified spherical image 420 (e.g., produced in part by diffusion inpainting) with information from ground truth images (e.g., produced from a camera placed in the environment). The similarity check operation 403 can be used to ensure the validity of the modified spherical image 420 and the results of the inpainting method and map construction operation 401. The similarity check operation 403 can also compare the modified spherical image 420 to stored reference images to identify artifacts or subtle transitions that are caused by diffusion-based inpainting, which would interfere with the operation of visual servoing. Other closed-loop feedback and image modification operations may be implemented based on the similarity check operation 403.

Figure 5A:
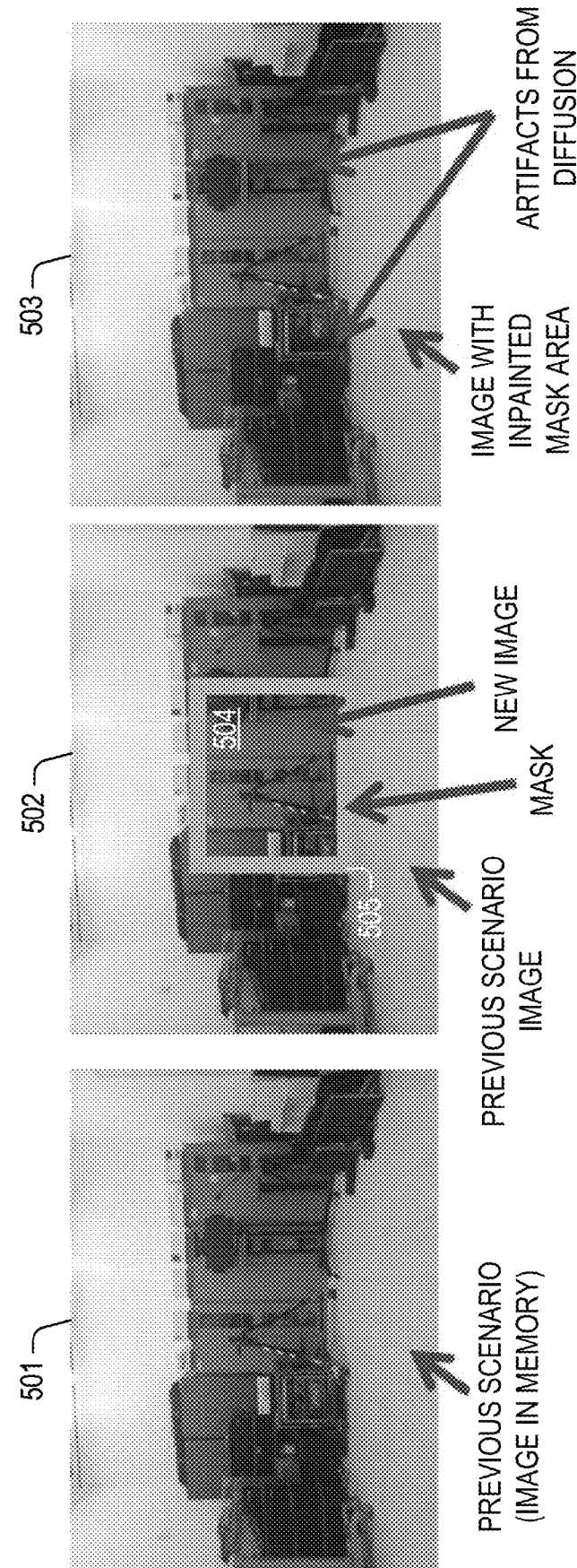
FIGS. 5A and 5B depict aspects of a diffusion-based image inpainting procedure, according to an example.
Figure 5B:
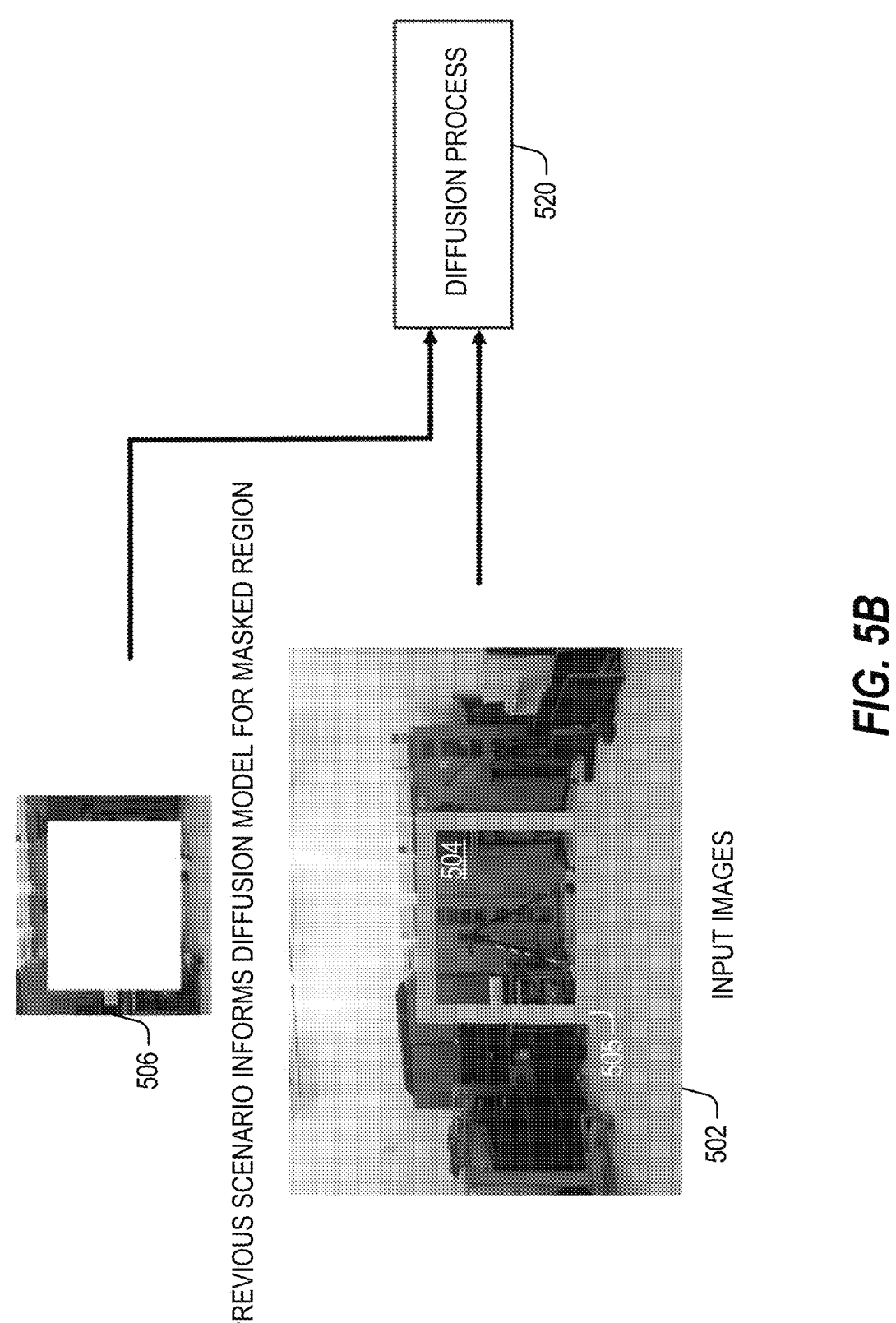

FIGS. 5A and 5B depict aspects of an example diffusion-based image inpainting procedure, applied to combine a new image captured of a current robot view (a current view image) with a previous view image in memory, e.g., an image captured from a larger area of the environment. As will be understood, these figures depict an example scenario of a fixed environment shown via two-dimensional images. The actual images maintained by a robotic system (or a control system used by the robotic system) can vary in shape or size, including with the use of three-dimensional image data or representations.

FIG. 5A depicts a first image 501 of a previous scenario, such as is provided by an image in memory in the robotic system. FIG. 5A also depicts image 502, showing the image of the previous scenario as overlaid with a new image 504 and a mask area 505. For example, the new image 504 may be a current view image captured in real time by a robot camera (e.g., the camera 108). This new image 504 captures a portion of the environment of the robot but includes much less information (and a smaller field of view) than is depicted in the larger environment in the image 501.

FIG. 5A also depicts modified image 503, showing the results of combining the new image 504 with the first image 501. The modified image 503 depicts the combination of the previous scenario image and the new image that includes an inpainted mask area (e.g., outlined in mask area 505) that is filled in with diffusion from a generative model. As will be understood, after this inpainting procedure, artifacts might appear in the mask area. This is particularly relevant in dynamic environments, where the previous scenario might not reflect real-world changes in the scene such as different or moved objects. However, most features of interest in the current image and the rest of the previous scenario can be maintained, providing robustness against such artifacts.

FIG. 5B includes another view of the image 502. This demonstrates that a diffusion process 520 produces an image mask to fill the mask area 505, as informed by a relevant area 506 of the pre-existing image data (e.g., an imaged area similar to, equal to, or overlapping the mask area 505). This pre-existing image data may serve as the initial condition for the diffusion process 520, helping to produce generative data that ensures a seamless transition and correction between the old and new images. Accordingly, the diffusion process 520 can be adapted to generate content that fills (inpaints) the mask area 505 between the image 502 and the new image 504, informed by whatever objects or data existed in this location in the previous scenario.

FIG. 6 depicts a block diagram of a process for implementing the visual servoing control 402 based on results of a diffusion-based image inpainting procedure. Here, this block diagram shows more details on the individual operations used to produce a modified image of the surrounding environment, and how the visual servoing control 402 is used to ultimately control one or more actuators 616 (e.g., actuators on the robotic arm 104) based on this modified image.

Figure 8:
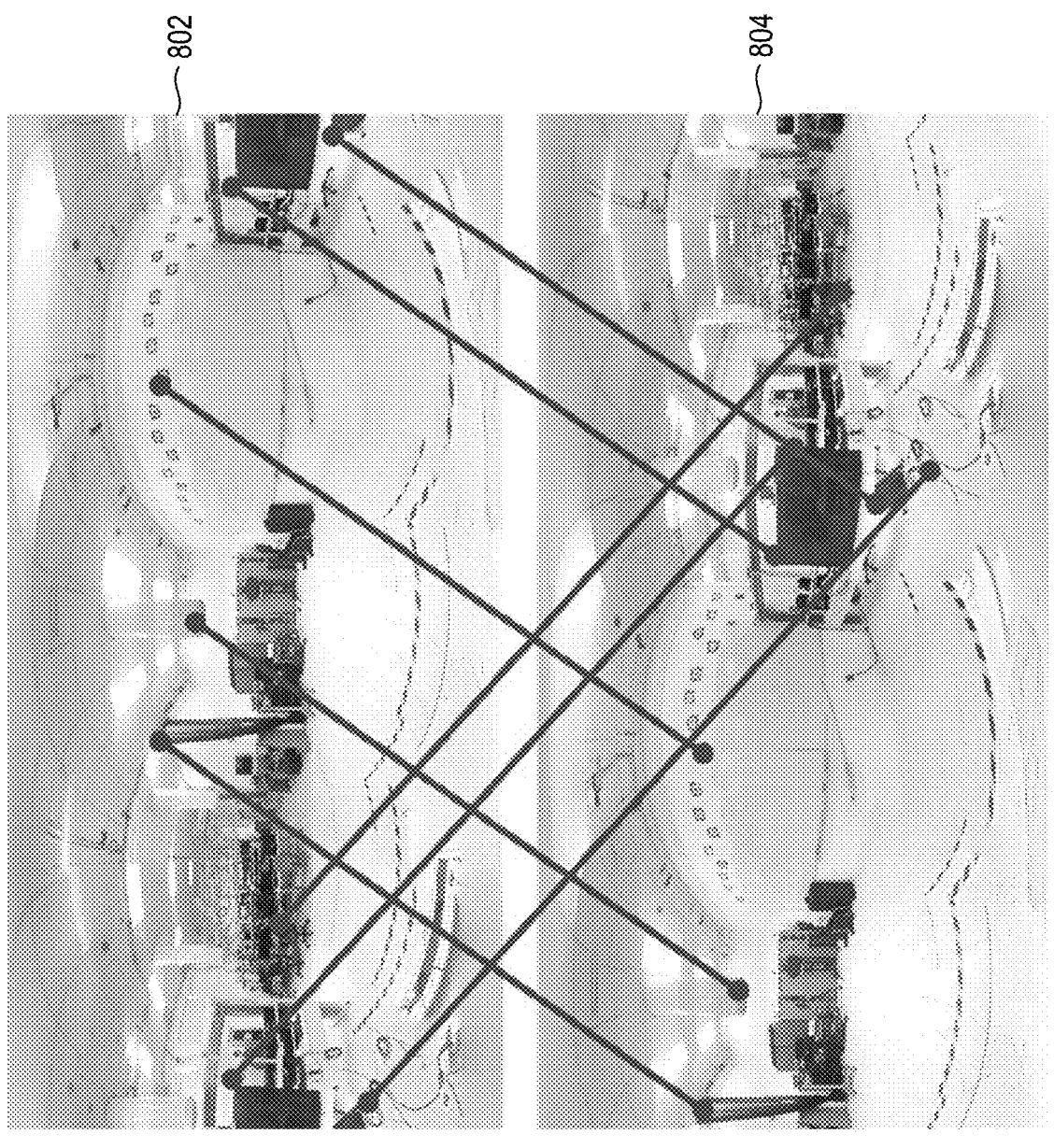
FIG. 8 depicts feature matching based on results of a diffusion-based image inpainting procedure, according to an example.

In an example, a spherical image is maintained for the environment in a data store 606, to maintain a consistent view of the previous environment scenario in memory. This spherical image can be constructed beforehand with a calibration process, such as a calibration process that involves capturing multiple images and combining them into a single spherical image. In some examples, the spherical image can be constructed using aspects of the inpainting mechanism and diffusion model described herein. An example of such an image, also referred to as the scenario stored in memory, is depicted in FIG. 8. A variety of different types of 2D representations of the same spherical image for the scenario can be created, centered at the robot.

As the robot captures images of its current view (e.g., an input image 602), the current view is inpainted based on coordinate matching 604 as the input image is blended into the existing spherical image. In one example, the scenario stored in memory is retrieved from the data store 606, and a shallow mask is applied to a region where the old scenario image and the new current view image must be joined. Then, the masked region is filled with a smooth transition using the inpainting method and map construction operation 401, such as with a diffusion process from a trained generative model. The goal view is identified in the spherical image and matched with the current view, within a goal computation and motion planning operation 610. The goal computation and motion planning operation 610 can be coordinated with feature matching operations 612 (e.g., shown in FIG. 8).

Based on the feature matching operations 612, a transformation T to transition the robot from the current view to the goal view can be computed. The visual servoing goal is to make this transformation reach the identity, meaning that all features match the same places in both images and the robot reaches the desired goal. Consequently, based on use of error computation functions 608 and 614, an error between T and the identity map is computed. The perceptual error computed with the error computation functions can be used to construct feedback for the robot actuators 616. Standard techniques from visual servoing control 402 can be employed, enabling the robot to adjust its movements with actuators 616 based on the error to achieve the desired goal configuration.

As will be understood, performing visual servoing over the modified spherical images enables more versatile motion planning techniques. For instance, instead of setting the end goal from the beginning, a trajectory of images across the spherical image can be designed, culminating in the goal view. This approach is particularly beneficial for energy and power reduction purposes. Further, visual servoing control 402 can be extended to support trajectory tracking, ensuring efficient and smooth movement of a robotic arm. This approach is highly effective in dynamic environments where the spatial relationship between the robotic arm and its surroundings can change rapidly. By continuously updating the spherical image with real-time inpainting, the system can adapt to new visual information as the environment evolves.

This ensures that the robot maintains accurate and reliable visual feedback, even when objects move or the scene changes. The ability to seamlessly integrate new images into the spherical map allows for robust error computation and correction, enhancing the robot's responsiveness and precision. Consequently, this method supports more flexible and resilient robotic operations in complex, real-world settings where static assumptions are inadequate.

Figure 7:
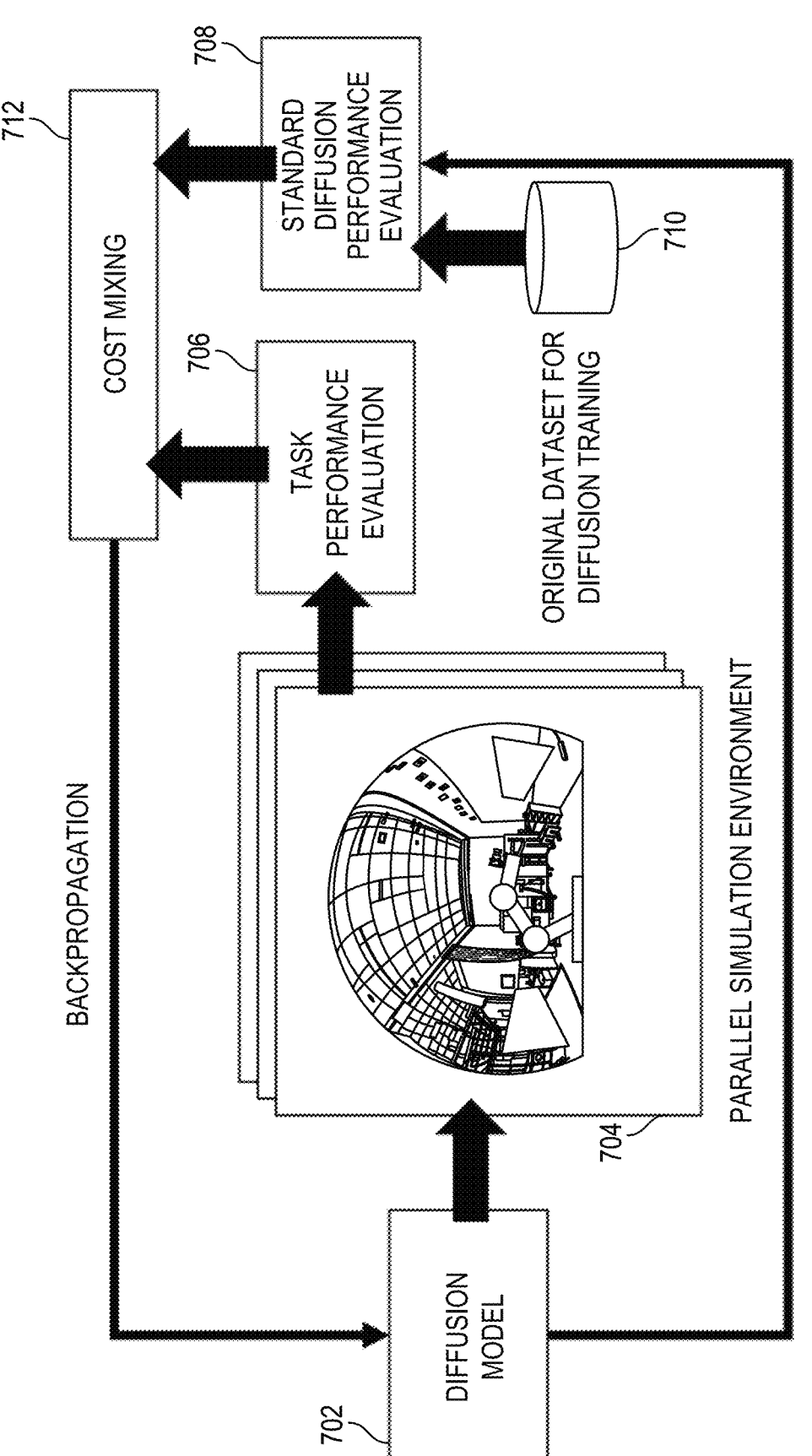
FIG. 7 depicts a block diagram of a process for fine tuning visual servoing task improvement, according to an example.

FIG. 7 depicts a block diagram of an example process for fine-tuning for servoing task improvement. Specifically, this diagram shows operational flows of how task performance evaluation 706) can be integrated with the evaluation of standard diffusion performance 708 from an original data set 710 for diffusion training. The evaluation of these aspects can be balanced with a cost mixing function 712, to achieve a balance between visual quality and task execution. Additionally, FIG. 7 depicts a closed-loop system that enables feedback from the cost mixing function 712 (e.g., via backpropagation), based on whether the diffusion model 702 enhances the visual servoing controller's manipulation capabilities. The diffusion model 702 may be refined based on use of a simulation-based environment 704, as the diffusion model 702 is fine-tuned to ensure the closed-loop task performance remains unaffected by any inpainting irregularities.

While a variety of pre-trained diffusion models can be used for inpainting as discussed above, some kinds of artifacts may still occur that affect the system's performance. To mitigate this, a penalization term can be added to the cost function during model training to reduce the occurrence of such artifacts. Although this adjustment may not eliminate the artifacts, this adjustment can help ensure that the generative content produced by the diffusion model 702 will not degrade or negatively affect the robot's task performance.

As will be understood, the present approaches that use a generative diffusion model provide benefits over other image stitching or combination techniques. Consider a scenario where the goal is to reconstruct a reference view from two incomplete views that are not perfectly aligned and have differing light intensities since they were captured at different times. Diffusion-based techniques can achieve an improvement over other combination techniques (like interpolation) when measuring similarity to a reference in the stitched area. This performance can be further enhanced if the diffusion technique is fine-tuned for the specific environment of the application.

FIG. 8 depicts feature matching based on example results of a diffusion-based image inpainting procedure. This depicts a result of matching a plurality of features in a current view 802 (e.g., a modified spherical image created from combining a current view image with a previous spherical image) to a goal view 804 (e.g., a spherical image).

As a use case example, feature matching of a spherical image can be used in assembly or validation scalability of a variety of electronic manufacturing components. Many electronic components (e.g., computer chips) include information that is difficult to sense with typical cameras due to the lens properties. Thus, to properly acquire data from the chip or electronic components, the special lens must be selected, limiting the camera's field of view and increasing the sensing resolution. This prevents traditional visual servoing algorithms from being applied to these scenarios. The techniques discussed herein can enable visual servoing across a large operational environment for the robot, while still allowing use of specialized cameras and lenses that have a limited field of view. Enabling visual servoing in this setting can also provide operational improvements over other approaches of robot localization and positioning, since visual servoing may be required to identify, scan, or correctly manipulate electronic components since this may require millimetric precision. Accordingly, the present approaches can be applied in a variety of settings based on different 2D spherical representations of the robot's workspace, as created using small steps of high-resolution cameras. Then, the approaches described herein can be used to precisely move to the target with feature matching (as shown in FIG. 8), as the robot can seamlessly perform actions such as scanning and manipulating objects in an automated manner.

In further examples, occlusions that occur in the field of view of a robot camera can be resolved using diffusion-based inpainting. For example, consider that in some use cases, a robot's view (e.g., from a camera located on the robot end-effector or arm) can be occasionally occluded by cables or components of a manufacturing, assembly, or validation platform, due to the dynamic nature of the scene. However, if the occlusion is detected (e.g., using depth information) when some object blocks a view of the portion of the environment, the area of occlusion can be used as a mask to inpaint the occluded area(s) based on image information that was previously captured. Thus, given information from previous views, a current occluded view may be resolved by merging a current view and a past view smoothly using diffusion techniques. One specific method for removing occlusion may be performed as follows. First, a mask area for the occlusion is identified in the current view and directly replaced with information taken from a previous view. This serves as the initial condition for the diffusion process. Then the diffusion process iterates over the whole image, refining the masked area and providing a smooth transition between the current view and the previous view information. The ability to correctly transition between current and previous view information is a distinct advantage of diffusion techniques over other interpolation methods.

FIG. 9 illustrates a flowchart showing an example technique 900 for visual servoing of a robot, based on real-time, diffusion-based image inpainting. The technique 900 may be performed by an autonomous mobile robot (AMR), a fixed robot, a controller device or devices in an edge or datacenter network (e.g., an orchestrator, a server, a mobile device, an IoT device, or the like), or related equipment used in connection with the control or operation of a robot.

The technique 900 includes an operation 902 to obtain (e.g., retrieve, capture, access) a current view image captured from a camera of a robot. This current view image captures a portion of an environment of the robot, such as from a camera that is attached to an effector or arm of the robot.

The technique 900 includes an operation 904 to combine the current view image with a previous view spherical image, to produce a modified spherical image. This previous view spherical image depicts the environment of the robot that surrounds the robot, and may be based on a 360-degree scene or field of view that is maintained for the environment around the robot (or, a substantially similar surround view such as a 270, 300, or 330 degree view). This previous view spherical image may be constructed from multiple prior images of the environment, such as from prior images that are combined by inpainting overlapping areas of the prior images using a generative diffusion model.

The technique 900 includes an operation 906 to perform inpainting of a mask area (e.g., a region around or overlapping the boundary of the current view image) using a generative diffusion model. For instance, the mask portion may include an outside portion of the current view image and a portion of the modified spherical image that surrounds the current view image. This inpainting is used to blend the environment of the current view image with the environment of the modified spherical image. In a specific example, the generative diffusion model is pre-trained based on multiple images of the environment (e.g., multiple spherical images, or portions of the field of view from the actual environment of the robot).

In an example, the technique 900 may include an operation 908 to optionally detect and correct occlusion in the current view image, using the previous view spherical image and the generative diffusion model. For example, at least one occlusion may be detected in the current view image that blocks a view of the portion of the environment of the robot. Inpainting may be performed on the area of the occlusion(s) in the current view image using the generative diffusion model, based on diffusion assisted by at least one previous view image that depicts the same view of the environment that is being occluded.

The technique 900 includes an operation 910 to perform (e.g., cause or directly control) visual servoing, and optionally, path planning, to move the robot or a component (e.g., arm, effector, etc.) of the robot, based on the modified spherical image. This may include generating or transmitting signals to other controllers or subsystems that actuate the movement of the robot components. In an example, the visual servoing of the robot may be based on (i) feature matching between one or more features of the modified spherical image and a goal spherical image, and (ii) an error of the feature matching between the one or more features in the modified spherical image and the goal spherical image.

Further operations may include fine-tuning the performance of the diffusion model and adapting the visual servoing. For example, operations not depicted may include measuring performance of the visual servoing of the robot based on the inpainting of the mask area, and modifying the generative diffusion model based on the performance of the visual servoing of the robot.

Figure 10A:
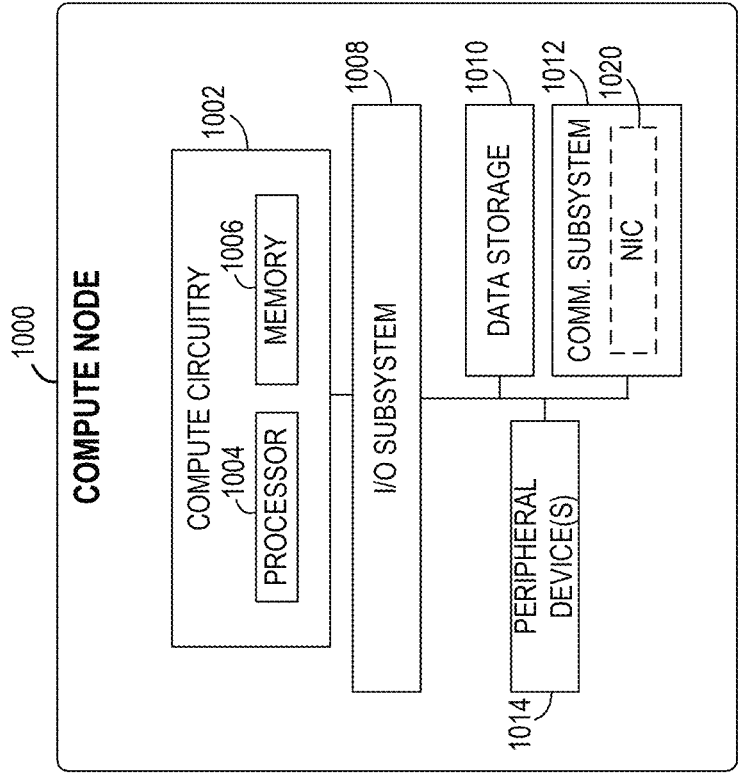
FIG. 10A provides an overview of example components deployed at a compute node.
Figure 10B:
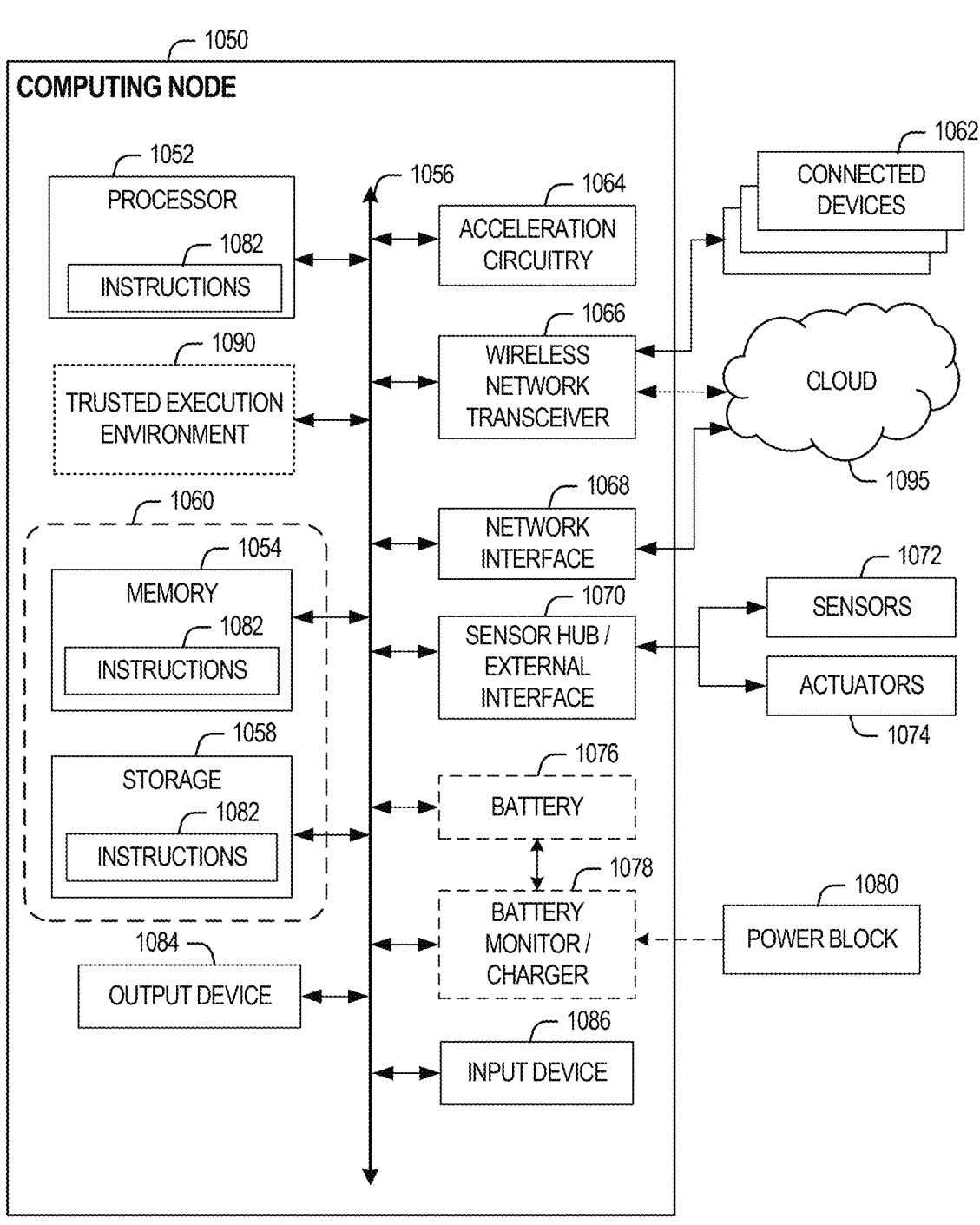
FIG. 10B provides a further overview of example components within a computing device.

In further examples, any of the computing nodes or devices used to implement these techniques may be implemented based on the components depicted in FIGS. 10A and 10B. Respective edge compute nodes may be embodied as a type of device, appliance, computer, or other "thing" capable of communicating with other edge, networking, or endpoint components. For example, an edge compute device may be embodied as a robot, a robot control system, a personal computer, server, a mobile computing device, a smart appliance, an in-vehicle compute system (e.g., a navigation system), a self-contained device having an outer case, shell, etc., or other device or system capable of performing the described functions.

In the simplified example depicted in FIG. 10A, an edge compute node 1000 includes a compute engine (also referred to herein as "compute circuitry") 1002, an input/output (I/O) subsystem 1008, data storage device 1010, a communication circuitry 1012 subsystem, and, optionally, one or more peripheral devices 1014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. The processor 1004 may be embodied as any type of processor capable of performing the functions described herein (e.g., executing an application). For example, the processor 1004 may be embodied as a multi-core processor(s), a microcontroller, a processing unit, a specialized or special purpose processing unit, or other processor or processing/controlling circuit.

In some examples, the processor 1004 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1004 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1004 may work in coordination with each other to execute many types of operations and instructions within and on behalf of the compute node 1000.

The memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1006 may be integrated into the processor 1004. The memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 or the main memory 1006) and other components of the compute circuitry 1002. For example, the I/O subsystem 1008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the memory 1006, and other components of the compute circuitry 1002, into the compute circuitry 1002.

The one or more illustrative data storage devices 1010 may be embodied as any type of devices configured for short-term or long-term storage of data such as, for example, memory devices and circuits, memory cards, hard disk drives, solid-state drives, or other data storage devices. Individual data storage devices 1010 may include a system partition that stores data and firmware code for the data storage device 1010. Individual data storage devices 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device (e.g., a gateway of an implementing computing system). The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., a gateway node). In some examples, the NIC 1020 may be embodied as part of a system-on-a-chip (SoC) that includes one or more processors, or included on a multichip package that also contains one or more processors. In some examples, the NIC 1020 may include a local processor (not shown) and/or a local memory (not shown) that are both local to the NIC 1020. In such examples, the local processor of the NIC 1020 may be capable of performing one or more of the functions of the compute circuitry 1002 described herein. Additionally, or alternatively, in such examples, the local memory of the NIC 1020 may be integrated into one or more components of the client compute node at the board level, socket level, chip level, or other levels.

Additionally, in some examples, a respective compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective compute node (whether a client, gateway, or aggregation node) in a computing system or like forms of appliances, computers, subsystems, circuitry, or other components.

In a more detailed example, FIG. 10B illustrates a block diagram of an example of components that may be present in a computing node 1050 for implementing the techniques (e.g., operations, processes, methods, and methodologies) described herein. This computing node 1050 provides a closer view of the respective components of node 1000 when implemented as or as part of a computing device (e.g., as a mobile device, a base station, server, gateway, etc.). The computing node 1050 may include any combinations of the hardware or logical components referenced herein, and it may include or couple with any device usable with a communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 1050, or as components otherwise incorporated within a chassis of a larger system.

The computing node 1050 may include processing circuitry in the form of a processor 1052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 10B.

The processor 1052 may communicate with a system memory 1054 over an interconnect 1056 (e.g., a bus). Any number of memory devices may be used to provide for a given amount of system memory. As examples, the memory 1054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the computing node 1050 may communicate with close devices, e.g., within about 10 meters, using a local transceiver based on Bluetooth Low Energy (BLE), or another low power radio, to save power. More distant connected devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in the cloud 1095 via local or wide area network protocols. The wireless network transceiver 1066 may be a low-power wide-area (LPWA) transceiver that follows the IEEE 802.15.4, or IEEE 802.15.4g standards, among others. The computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the cloud 1095 or to other devices, such as the connected devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC

1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components (circuitry 1064, transceiver 1066, NIC 1068, or interface 1070). Accordingly, in various examples, applicable means for communicating (e.g., receiving, transmitting, etc.) may be embodied by such communications circuitry.

The computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The hub or interface 1070 further may be used to connect the computing node 1050 to actuators 1074, such as power switches, valve actuators, an audible sound generator, a visual warning device, and the like.

In some optional examples, various input/output (I/O) devices may be present within or connected to, the computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 1050. A display or console hardware, in the context of the present system, may be used to provide output and receive input of a computing system; to manage components or services of a computing system; identify a state of a computing component or service; or to conduct any other number of management or administration functions or service use cases.

A battery 1076 may power the computing node 1050, although, in examples in which the computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1082 on the processor 1052 (separately, or in combination with the instructions 1082 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the computing node 1050 through the TEE 1090 and the processor 1052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or combinations with one or more of the other examples.

Example 1 is at least one machine-readable medium, including instructions, which when executed by processing circuitry, cause the processing circuitry to perform operations to: obtain a current view image from a camera of a robot, wherein the current view image captures a portion of an environment of the robot; obtain a spherical image that depicts the environment of the robot surrounding the robot; combine the current view image with the spherical image to produce a modified spherical image; perform inpainting in a mask area of the modified spherical image using a generative diffusion model, the inpainting to blend the current view image with the spherical image; and cause visual servoing of the robot based on the modified spherical image, the visual servoing to move the robot to a target in the environment.

In Example 2, the subject matter of Example 1 optionally includes subject matter where the generative diffusion model is pre-trained based on multiple images of the environment.

In Example 3, the subject matter of Example 2 optionally includes subject matter where the instructions further cause the processing circuitry to perform operations to: detect at least one occlusion in the current view image, wherein the at least one occlusion blocks a view of the portion of the environment of the robot; and perform inpainting of the at least one occlusion in the current view image using the generative diffusion model, wherein the inpainting of the at least one occlusion is based on at least one previous view image that depicts the view of the portion of the environment.

In Example 4, the subject matter of any one or more of Examples 1-3 optionally include subject matter where the instructions further cause the processing circuitry to perform operations to: measure performance of the visual servoing of the robot based on the inpainting of the mask area; and modify the generative diffusion model based on the performance of the visual servoing of the robot.

In Example 5, the subject matter of any one or more of Examples 1-4 optionally include subject matter where the visual servoing of the robot is caused based on: feature matching between one or more features of the modified spherical image and a goal spherical image, and an error of the feature matching between the one or more features in the modified spherical image and the goal spherical image.

In Example 6, the subject matter of any one or more of Examples 1-5 optionally include subject matter where the spherical image is based on a 360-degree scene maintained for the environment around the robot.

In Example 7, the subject matter of Example 6 optionally includes subject matter where the spherical image is constructed from multiple prior images of the environment, and wherein the prior images are combined by inpainting overlapping areas of the prior images using the generative diffusion model.

In Example 8, the subject matter of any one or more of Examples 1-7 optionally include subject matter where the mask area where inpainting is performed includes an outside portion of the current view image and a portion of the modified spherical image that surrounds the current view image.

In Example 9, the subject matter of any one or more of Examples 1-8 optionally include subject matter where the camera that provides the current view image is attached to an end effector, a joint, or a segment of the robot.

In Example 10, the subject matter of Example 9 optionally includes subject matter where the instructions further cause the processing circuitry to perform operations to: perform path planning of the end effector based on the modified spherical image.

In Example 11, the subject matter of Example 10 optionally includes subject matter where the robot is configured to perform path planning and visual servoing of the end effector based on the modified spherical image, independent of (e.g., without any use of) an external positioning or localization system.

Example 12 is a system comprising: processing circuitry; and memory including instructions, which when executed by the processing circuitry, cause the processing circuitry to: access a current view image captured from a camera of a robot, wherein the current view image captures a portion of an environment of the robot; access a spherical image that depicts the environment of the robot surrounding the robot; combine the current view image with the spherical image to produce a modified spherical image; perform inpainting in a mask area of the modified spherical image using a generative diffusion model, the inpainting to blend the current view image with the spherical image; and cause visual servoing of the robot based on the modified spherical image, the visual servoing to move the robot to a target in the environment.

In Example 13, the subject matter of Example 12 optionally includes subject matter where the instructions further cause the processing circuitry to perform operations to: detect at least one occlusion in the current view image, wherein the at least one occlusion blocks a view of the portion of the environment of the robot; and perform inpainting of the at least one occlusion in the current view image using the generative diffusion model, wherein the inpainting of the at least one occlusion is based on at least one previous view image that depicts the view of the portion of the environment; wherein the generative diffusion model is pre-trained based on multiple images of the environment.

In Example 14, the subject matter of any one or more of Examples 12-13 optionally include subject matter where the instructions further cause the processing circuitry to perform operations to: measure performance of the visual servoing of the robot based on the inpainting of the mask area; and modify the generative diffusion model based on the performance of the visual servoing of the robot.

In Example 15, the subject matter of any one or more of Examples 12-14 optionally include subject matter where the visual servoing of the robot is controlled based on: feature matching between one or more features of the modified spherical image and a goal spherical image, and an error of the feature matching between the one or more features in the modified spherical image and the goal spherical image.

In Example 16, the subject matter of any one or more of Examples 12-15 optionally include subject matter where the spherical image is based on a 360-degree scene maintained for the environment around the robot, and wherein the spherical image is constructed from multiple prior images of the environment, and wherein the prior images are combined by inpainting overlapping areas of the prior images using the generative diffusion model.

In Example 17, the subject matter of any one or more of Examples 12-16 optionally include subject matter where the mask area where inpainting is performed includes an outside portion of the current view image and a portion of the modified spherical image that surrounds the current view image.

In Example 18, the subject matter of any one or more of Examples 12-17 optionally include subject matter where the instructions further cause the processing circuitry to: perform path planning of an end effector of the robot based on the modified spherical image; wherein the robot is configured to perform path planning and visual servoing of the end effector based on the modified spherical image independent of (e.g., without any use of) an external positioning or localization system.

Example 19 is an apparatus comprising: memory means for storing a current view image and a spherical image, wherein the current view image captures a portion of an environment of a robot, and wherein the spherical image depicts the environment of the robot surrounding the robot; processing means for generating a modified spherical image, the processing means configured to combine the current view image with the spherical image to produce the modified spherical image and perform inpainting in a mask area of the modified spherical image using a generative diffusion model, wherein the inpainting blends the current view image with the spherical image; and control means for servoing the robot based on the modified spherical image, wherein the servoing causes the robot to move to a target in the environment.

In Example 20, the subject matter of Example 19 optionally includes subject matter where the processing means is further configured to: detect at least one occlusion in the current view image that blocks a view of the portion of the environment of the robot, and perform inpainting of the at least one occlusion in the current view image using the generative diffusion model.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. At least one machine-readable medium, including instructions, which when executed by processing circuitry, cause the processing circuitry to perform operations to:
  obtain a current view image from a camera of a robot, wherein the current view image captures a portion of an environment of the robot;
  obtain a spherical image that depicts the environment of the robot surrounding the robot;
  combine the current view image with the spherical image to produce a modified spherical image, based on inpainting a mask area of the modified spherical image with a generative diffusion model to blend the current view image with the spherical image; and
  cause visual servoing of the robot based on the modified spherical image, the visual servoing to move the robot to a target located in the environment.

2. The at least one machine-readable medium of claim 1, wherein the generative diffusion model is pre-trained based on multiple images of the environment.

3. The at least one machine-readable medium of claim 2, wherein the instructions further cause the processing circuitry to perform operations to:
  detect at least one occlusion in the current view image, wherein the at least one occlusion blocks a view of the portion of the environment of the robot; and
  perform inpainting of the at least one occlusion in the current view image using the generative diffusion model, wherein the inpainting of the at least one occlusion is based on at least one previous view image that depicts the view of the portion of the environment.

4. The at least one machine-readable medium of claim 1, wherein the instructions further cause the processing circuitry to perform operations to:
  measure performance of the visual servoing of the robot based on the inpainting of the mask area; and
  modify the generative diffusion model based on the performance of the visual servoing of the robot.

5. The at least one machine-readable medium of claim 1, wherein the visual servoing of the robot is caused based on: feature matching between one or more features of the modified spherical image and a goal spherical image, and an error of the feature matching between the one or more features in the modified spherical image and the goal spherical image.

6. The at least one machine-readable medium of claim 1, wherein the spherical image is based on a 360-degree scene maintained for the environment around the robot.

7. The at least one machine-readable medium of claim 6, wherein the spherical image is constructed from multiple prior images of the environment, and wherein the prior images are combined by inpainting overlapping areas of the prior images using the generative diffusion model.

8. The at least one machine-readable medium of claim 1, wherein the mask area where inpainting is performed includes an outside portion of the current view image and a portion of the modified spherical image that surrounds the current view image.

9. The at least one machine-readable medium of claim 1, wherein the camera that provides the current view image is attached to an end effector, a joint, or a segment of the robot.

10. The at least one machine-readable medium of claim 9, wherein the instructions further cause the processing circuitry to perform operations to:

perform path planning of the end effector based on the modified spherical image.

11. The at least one machine-readable medium of claim 10, wherein the robot is configured to perform path planning and visual servoing of the end effector based on the modified spherical image independent of an external positioning system.

12. A system comprising:

processing circuitry; and memory including instructions, which when executed by the processing circuitry, cause the processing circuitry to:

access a current view image captured from a camera of a robot, wherein the current view image captures a portion of an environment of the robot;

access a spherical image that depicts the environment of the robot surrounding the robot;

combine the current view image with the spherical image to produce a modified spherical image, based on inpainting a mask area of the modified spherical image with a generative diffusion model to blend the current view image with the spherical image; and control visual servoing of the robot based on the modified spherical image, the visual servoing to move the robot to a target located in the environment.

13. The system of claim 12, wherein the instructions further cause the processing circuitry to perform operations to:

detect at least one occlusion in the current view image, wherein the at least one occlusion blocks a view of the portion of the environment of the robot; and perform inpainting of the at least one occlusion in the current view image using the generative diffusion model, wherein the inpainting of the at least one occlusion is based on at least one previous view image that depicts the view of the portion of the environment;

wherein the generative diffusion model is pre-trained based on multiple images of the environment.

14. The system of claim 12, wherein the instructions further cause the processing circuitry to perform operations to:

measure performance of the visual servoing of the robot based on the inpainting of the mask area; and modify the generative diffusion model based on the performance of the visual servoing of the robot.

15. The system of claim 12, wherein the visual servoing of the robot is controlled based on: feature matching between one or more features of the modified spherical image and a goal spherical image, and an error of the feature matching between the one or more features in the modified spherical image and the goal spherical image.

16. The system of claim 12, wherein the spherical image provides a 360-degree view of the environment around the robot, and wherein the spherical image is constructed from multiple prior images of the environment, and wherein the prior images are combined by inpainting overlapping areas of the prior images using the generative diffusion model.

17. The system of claim 12, wherein the mask area where inpainting is performed includes an outside portion of the current view image and a portion of the modified spherical image that surrounds the current view image.

18. The system of claim 12, wherein the instructions further cause the processing circuitry to:

perform path planning of an end effector of the robot based on the modified spherical image;

wherein the robot is configured to perform path planning and visual servoing of the end effector based on the modified spherical image independent of an external positioning system.

19. An apparatus comprising:

memory means for storing a current view image and a spherical image, wherein the current view image captures a portion of an environment of a robot, and wherein the spherical image depicts the environment of the robot surrounding the robot;

processing means for generating a modified spherical image, the processing means configured to combine the current view image with the spherical image to produce the modified spherical image and perform inpainting in a mask area of the modified spherical image using a generative diffusion model, wherein the inpainting blends the current view image with the spherical image; and control means for servoing the robot based on the modified spherical image, wherein the servoing causes the robot to move to a target located in the environment.

20. The apparatus of claim 19, wherein the processing means is further configured to: detect at least one occlusion in the current view image that blocks a view of the portion of the environment of the robot, and perform inpainting of the at least one occlusion in the current view image using the generative diffusion model.

\* \* \* \* \*